(12) United States Patent
Shahana (10) Patent No.: US 9,199,688 B2
(45) Date of Patent: Dec. 1, 2015

(54) BICYCLE CONTROL DEVICE

(75) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 1116 days.

(21) Appl. No.: 12/138,509

(22) Filed: Jun. 13, 2008

(65) Prior Publication Data

US 2009/0308194 A1 Dec. 17, 2009

(51) Int. Cl.
*B62K 23/06* (2006.01)
*B62M 25/04* (2006.01)

(52) U.S. Cl.
CPC ............. *B62K 23/06* (2013.01); *B62M 25/04* (2013.01); *Y10T 74/20438* (2015.01)

(58) Field of Classification Search
USPC ............. 74/502.2, 488, 489, 473.14, 473.15, 74/528, 529, 532–534; 280/276, 277; 188/319.2, 299.1, 300
See application file for complete search history.

(56) References Cited

U.S. PATENT DOCUMENTS

| | | | | |
|---|---|---|---|---|
| 1,088,595 A * | 2/1914 | Larkin | ........................ | 74/502.2 |
| 1,100,482 A * | 6/1914 | Herzmark | .................... | 74/501.6 |
| 1,551,823 A * | 9/1925 | Guy | ............................ | 74/502.2 |
| 3,972,247 A * | 8/1976 | Armstrong | ...................... | 74/489 |
| 4,785,683 A * | 11/1988 | Buckley et al. | ................ | 74/489 |
| 4,850,241 A * | 7/1989 | Buckley et al. | ............. | 74/502.2 |
| 5,275,264 A * | 1/1994 | Isella | ........................ | 188/299.1 |
| 5,287,766 A * | 2/1994 | Nagano | ........................ | 74/502.2 |
| 5,419,216 A * | 5/1995 | Hinschlager | ................. | 74/502.2 |
| 5,676,022 A * | 10/1997 | Ose | ............................... | 74/502.2 |
| 5,730,030 A * | 3/1998 | Masui | ........................ | 74/473.13 |
| 5,957,002 A * | 9/1999 | Ueng | ........................... | 74/502.2 |
| 6,767,024 B1 | 7/2004 | Kuo | | |
| 6,817,264 B2 * | 11/2004 | Hiura et al. | ...................... | 74/535 |
| 7,124,873 B2 * | 10/2006 | Tsumiyama | ................. | 74/502.2 |
| 7,281,489 B2 * | 10/2007 | Kawakami | .................... | 116/28.1 |
| 7,611,497 B2 * | 11/2009 | Wollschlager | ................ | 604/246 |
| 7,806,022 B2 * | 10/2010 | Hara | ............................ | 74/502.2 |
| 2005/0103149 A1 * | 5/2005 | Hunt et al. | ................... | 74/502.2 |
| 2005/0241430 A1 | 11/2005 | Kawakami | | |
| 2005/0252330 A1 | 11/2005 | Denk | | |
| 2006/0070479 A1 | 4/2006 | Ose | | |

FOREIGN PATENT DOCUMENTS

| | | |
|---|---|---|
| EP | 1 327 576 A2 | 7/2003 |
| JP | 10-053183 A | 2/1998 |

OTHER PUBLICATIONS

German Search Report of corresponding German Application No. 10 2009 011 392.4, dated Dec. 1, 2009.

* cited by examiner

*Primary Examiner* — Daniel Yabut
(74) *Attorney, Agent, or Firm* — Global IP Counselors (57) ABSTRACT

A bicycle control device is provided with a main support shaft, a first control unit and a second control unit. Each of the control units includes a wire takeup element, a positioning structure and an operating member. The wire takeup elements are both rotatably mounted on the main support shaft. The positioning structures are operatively coupled to their respective wire takeup elements to selectively maintain their respective wire takeup elements in one of at least two positions. The operating members are operatively coupled to their respective positioning structure to change a current position of their respective wire takeup element. The first wire takeup element is stationary when the second operating member is operated to change the current position of the second wire takeup element such that the current position of the first wire takeup element always remains the same in response to operation of the second operating member.

12 Claims, 9 Drawing Sheets

BICYCLE CONTROL DEVICE

BACKGROUND OF THE INVENTION

1. Field of the Invention

This invention generally relates to a bicycle control device for controlling two different bicycle components.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames which typically transmitted the shocks resulting from rough riding surfaces directly to the rider. In other words, most bicycles were not provided with any front or rear suspension. Recently, bicycles, especially mountain bikes (MTB) and all terrain bikes (ATB), have been outfitted with front and/or rear suspension assemblies to absorb the shocks transmitted to the rider when riding on a rough road.

In these bicycles with suspensions, it is sometimes desirable to be able to quickly adjust or lockout the suspension as needed and/or desired. Thus, there have been proposals to provide a suspension control device on the handlebar of the bicycle so that the rider can adjust or lockout the suspension as needed and or desired while riding. Three examples of suspension control devices for bicycle suspensions are disclosed in U.S. Pat. No. 6,767,024, U.S. Patent Publication No. 2005/0103149 and U.S. Patent Publication No. 2005/0252330. While these suspension control devices are functional, it is desirable to provide a suspension control device that is simple to operate.

Moreover, a bicycle is typically equipped with several component parts that need to be manually operated by the rider. Such component parts include gear changer devices (gear shifters) and brake devices. Conventionally, separate control devices have been used to operate each of these component parts. Preferably, these control devices are mounted on the handlebar adjacent the hand grips. Thus, it is desirable to mount the control devices in a compact manner so that the rider's hands can remain on the hand grips while operating the control devices. However, when several control devices are mounted on the handlebar, it can often be difficult and or confusing to operate each of the control devices. In addition, when the control devices are combined into a single unit, they often become complex and/or bulky.

In view of the above, it will be apparent to those skilled in the art from this disclosure that there exists a need for an improved control device. This invention addresses this need in the art as well as other needs, which will become apparent to those skilled in the art from this disclosure.

SUMMARY OF THE INVENTION

One object of the present invention is to provide a bicycle control device that is easy for the rider to operate two different components using a single integrated unit.

Another object of the present invention is to provide a bicycle control device that is relatively simple and that can operate two different components.

The foregoing objects can basically be attained by providing a bicycle control device that basically comprises a main support shaft, a first control unit and a second control unit. The first control unit includes a first wire takeup element, a first positioning structure and a first operating member. The first wire takeup element is rotatably mounted on the main support shaft. The first positioning structure is operatively coupled to the first wire takeup element to selectively maintain the first wire takeup element in one of at least two positions. The first operating member is operatively coupled to the first positioning structure to change a current position of the first wire takeup element. The second control unit includes a second wire takeup element, a second positioning structure and a second operating member. The second wire takeup element is rotatably mounted on the main support shaft. The second positioning structure is operatively coupled to the second wire takeup element to selectively maintain the second wire takeup element in one of at least two positions. The second operating member is operatively coupled to the second positioning structure to change a current position of the second wire takeup element. The first wire takeup element is stationary when the second operating member is operated to change the current position of the second wire takeup element such that the current position of the first wire takeup element always remains the same in response to operation of the second operating member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
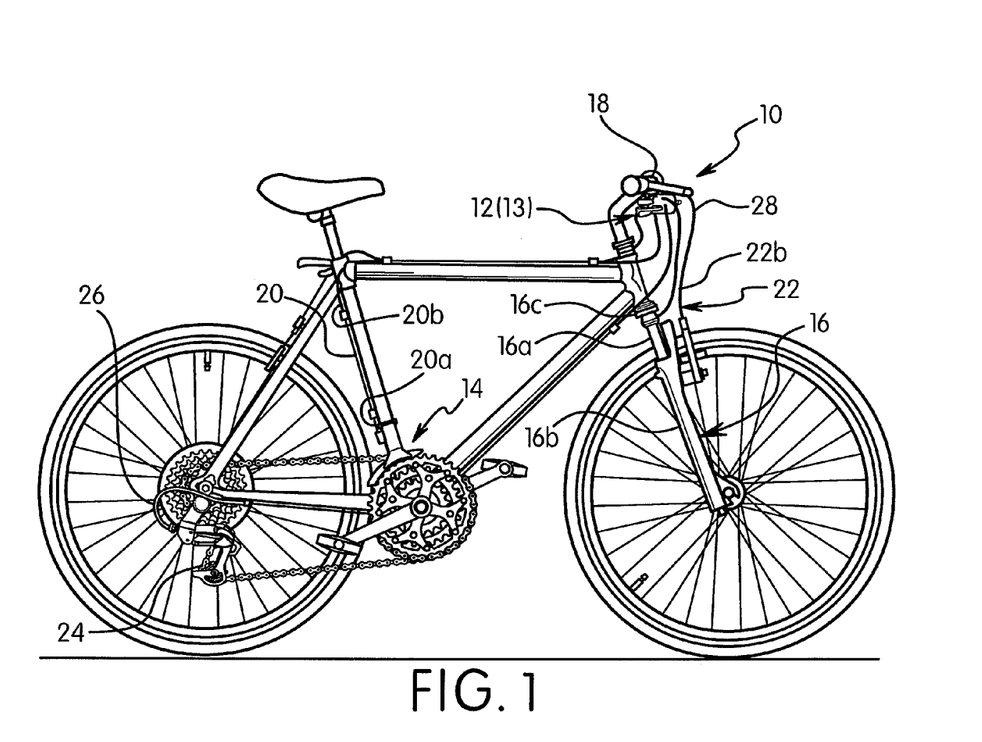
FIG. 1 is a side elevational view of a bicycle equipped with a bicycle control or operating device in accordance with one embodiment.
Figure 2:
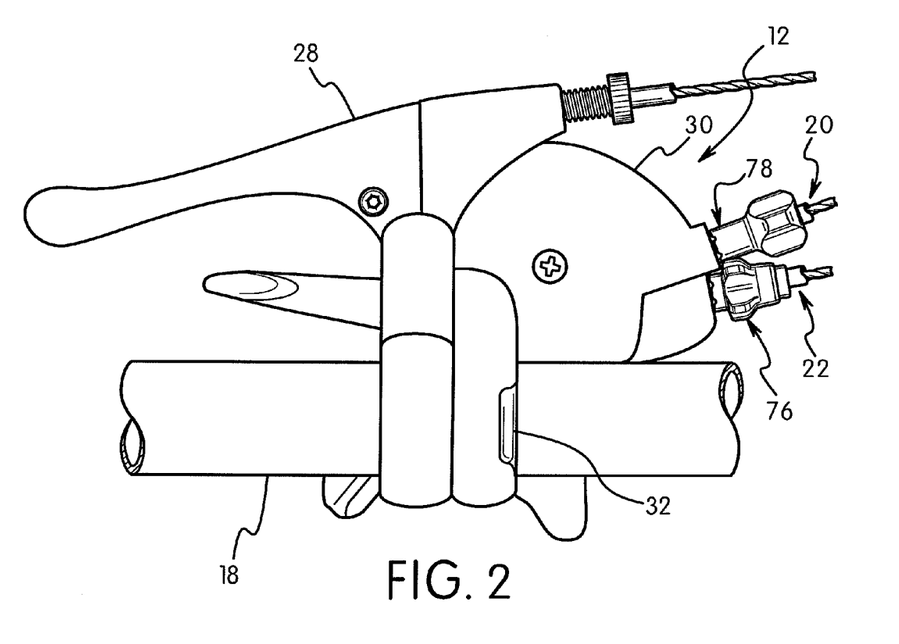
FIG. 2 is a top plan view of the bicycle control or operating device in accordance with the illustrated embodiment.
Figure 3:
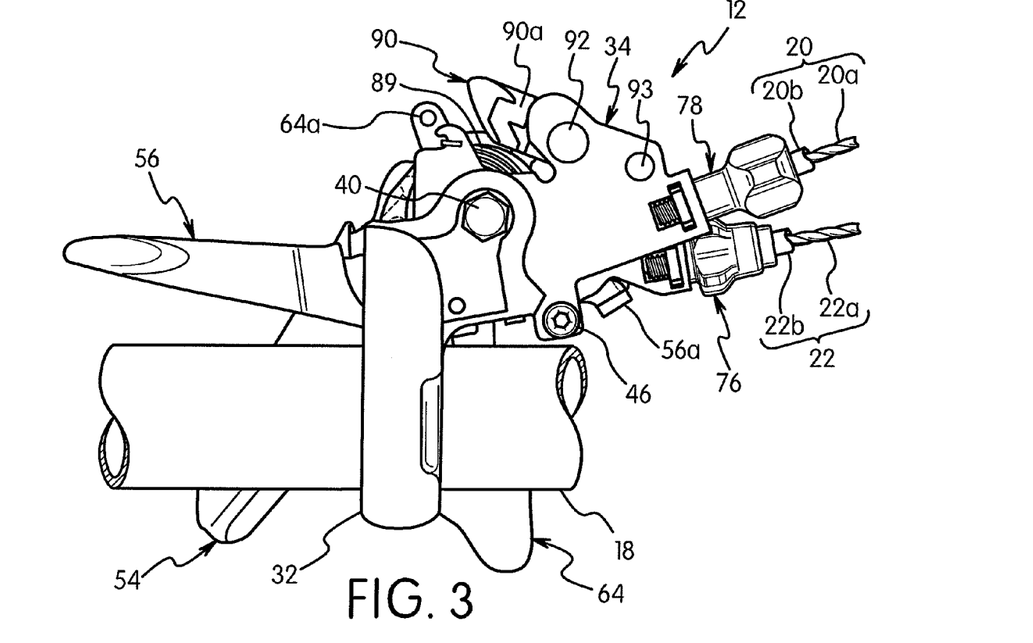
FIG. 3 is a top plan view of the bicycle control or operating device illustrated in FIG. 2 with the housing removed.
Figure 4:
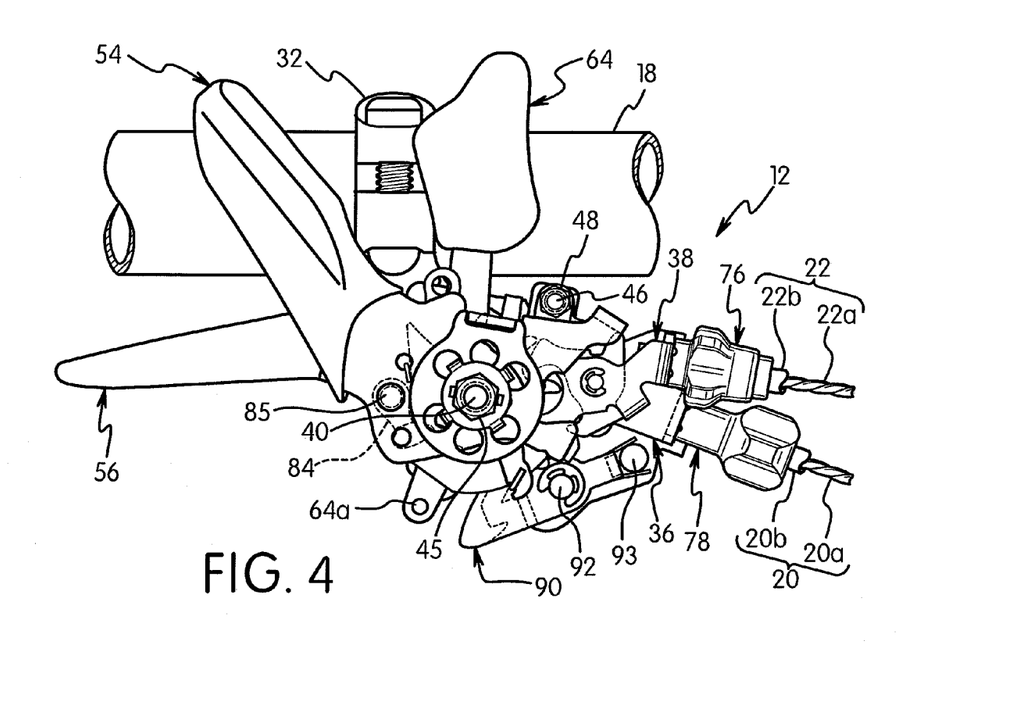
FIG. 4 is a bottom plan view of the bicycle control or operating device illustrated in FIGS. 2 and 3 with the housing removed.

Referring initially to FIGS. 1 and 2, a bicycle 10 is illustrated equipped with a pair of bicycle control or operating devices 12 and 13, with the bicycle control device 12 being configured in accordance with one embodiment. The bicycle control device 12 is a left hand side control device operated by the rider's left hand, while the bicycle shift operating device 13 is a right hand side control device operated by the rider's right hand. As discussed below, the bicycle control device 12 operates two different (separate and distinct) bicycle components of the bicycle 10.

Preferably, the bicycle control device 12 is shift and suspension control device for controlling a part of a bicycle drive train and a bicycle suspension. In the illustrated embodiment, the bicycle 10 is equipped with a various conventional components, including a front derailleur 14 (e.g., a part of a bicycle drive train) and a suspension fork 16. The bicycle control device 12 is mounted on a handlebar 18, which is fixed to an upper part of the suspension fork 16. In this illustrated embodiment, the bicycle control device 12 operates both the front derailleur 14 and the suspension fork 16. A shift operating cable 20 operatively connects the front derailleur 14 to the bicycle control device 12. The front derailleur 14 can be moved between at least two different gear positions by the bicycle control device 12 selectively pulling or releasing the shift operating cable 20. Preferably, the front derailleur 14 has three shift positions. Similarly, a suspension state switching cable 22 operatively connects the suspension fork 16 to the bicycle control device 12. The suspension fork 16 can be switched between a locked (off) state and an operational (on) state by the bicycle control device 12 selectively pulling or releasing the suspension state switching cable 22. The locked (off) state corresponds to a suspension operating state in which the suspension fork 16 becomes a rigid fork (i.e., the shock absorbing function does not operate). The operational (on) state corresponds to a suspension operating state in which the suspension fork 16 compresses and expands in response to changes in the terrain (i.e., the shock absorbing function does operate).

In the illustrated embodiment, the bicycle control device 13 is operatively coupled to a rear derailleur 24 via a shift operating cable 26. Alternatively, the bicycle control devices 12 and 13 can be switched so that the rider can operate the front and rear derailleurs 14 and 24 with opposite hands as needed and/or desired.

Preferably, the operating cables 20, 22 and 26 are conventional bicycle control cables that have an outer casing the covers an inner wire. In other words, each of the operating cables 20, 22 and 26 basically includes an inner wire slidably received within an outer casing. For example, as seen in FIG. 2, the operating cable 20 has an inner wire 20a with an outer casing 20b covering the inner wire 20a, while the operating cable 22 has an inner wire 22a with an outer casing 22b covering the inner wire 22a.

As seen in FIG. 2, the bicycle control device 12 is arranged on the handlebar 18 closely adjacent to a brake lever 28 on the inward side of the brake lever 28. The bicycle control device 12 is configured such that it can shift the front derailleur 14 among three shift positions and such that it can switch the operating state of the suspension fork 16 between an on-state and an off-state. Preferably, the bicycle control device 12 has a housing 30 for covering the internal parts and a handlebar clamp or bracket 32 for securing the bicycle control device 12 to the handlebar 18. The handlebar clamp 32 is preferably made of, for example, metal and configured to be fastened to the handlebar 18 by tightening a bolt. The housing 30 of the bicycle control device 12 houses the internal parts of the bicycle control device 12, which are discussed below.

As seen in FIG. 1, the front derailleur 14 is a conventional front derailleur, and thus, the front derailleur 14 will not be discussed or illustrated in detail herein. Of course, the bicycle control device 12 could be operatively coupled to other types of cable operated drive train components, e.g., a rear derailleur, an internal gear hub, etc.

As also seen in FIG. 1, the suspension fork 16 has a pair of telescopic tubes 16a and 16b for absorbing shocks while riding the bicycle 10 over rough terrain. The suspension fork 16 is provided with a cable operated lockout device 16c. Cable operated lockout device 16c is known in the bicycle field, and thus, the precise structure of the lockout device will not be discussed or illustrated in detail herein. Moreover, it will be apparent to those skilled in the art from this disclosure that the bicycle control device 12 can be used with a rear suspension. In other words, a pair of the bicycle control devices can be provided on a single bicycle with one controlling a front suspension and the other controlling the rear suspension as needed and/or desired.

Figure 5:
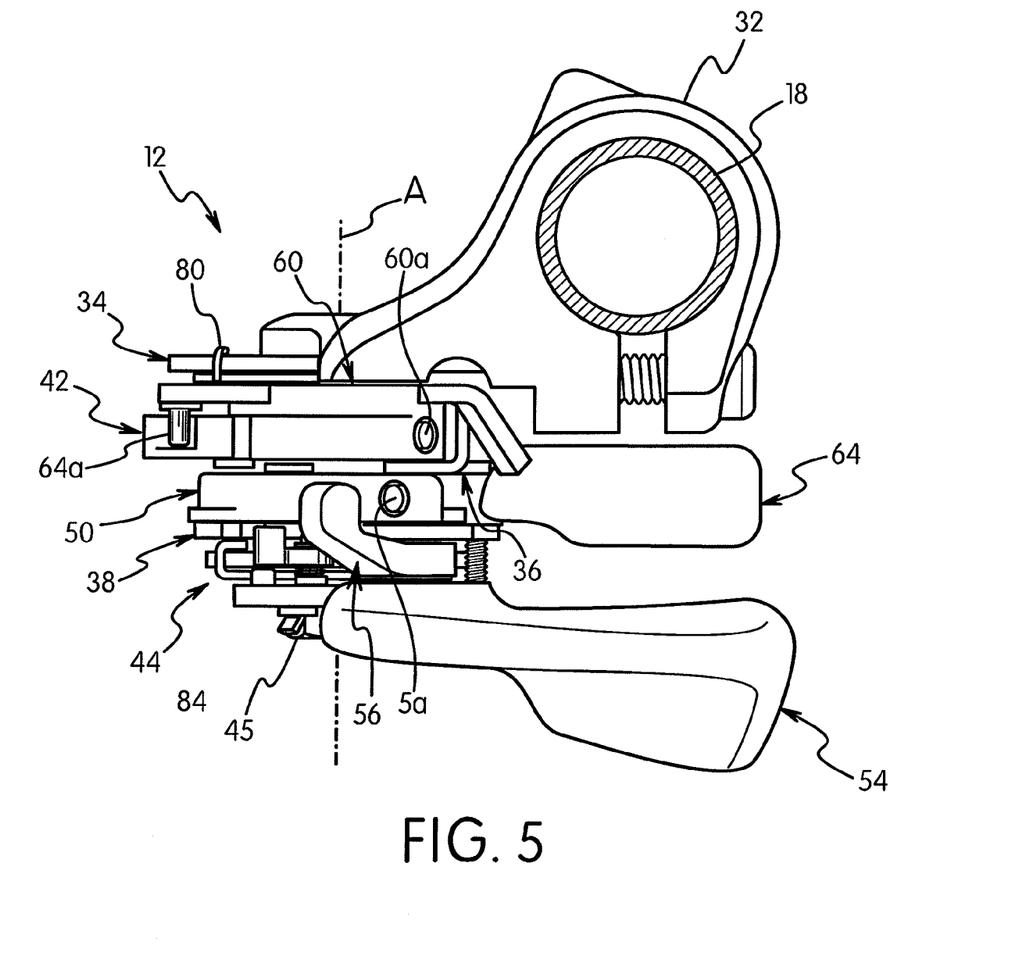
FIG. 5 is an outside elevational view of the bicycle control or operating device illustrated in FIGS. 2 to 4 with the housing removed.
Figure 6:
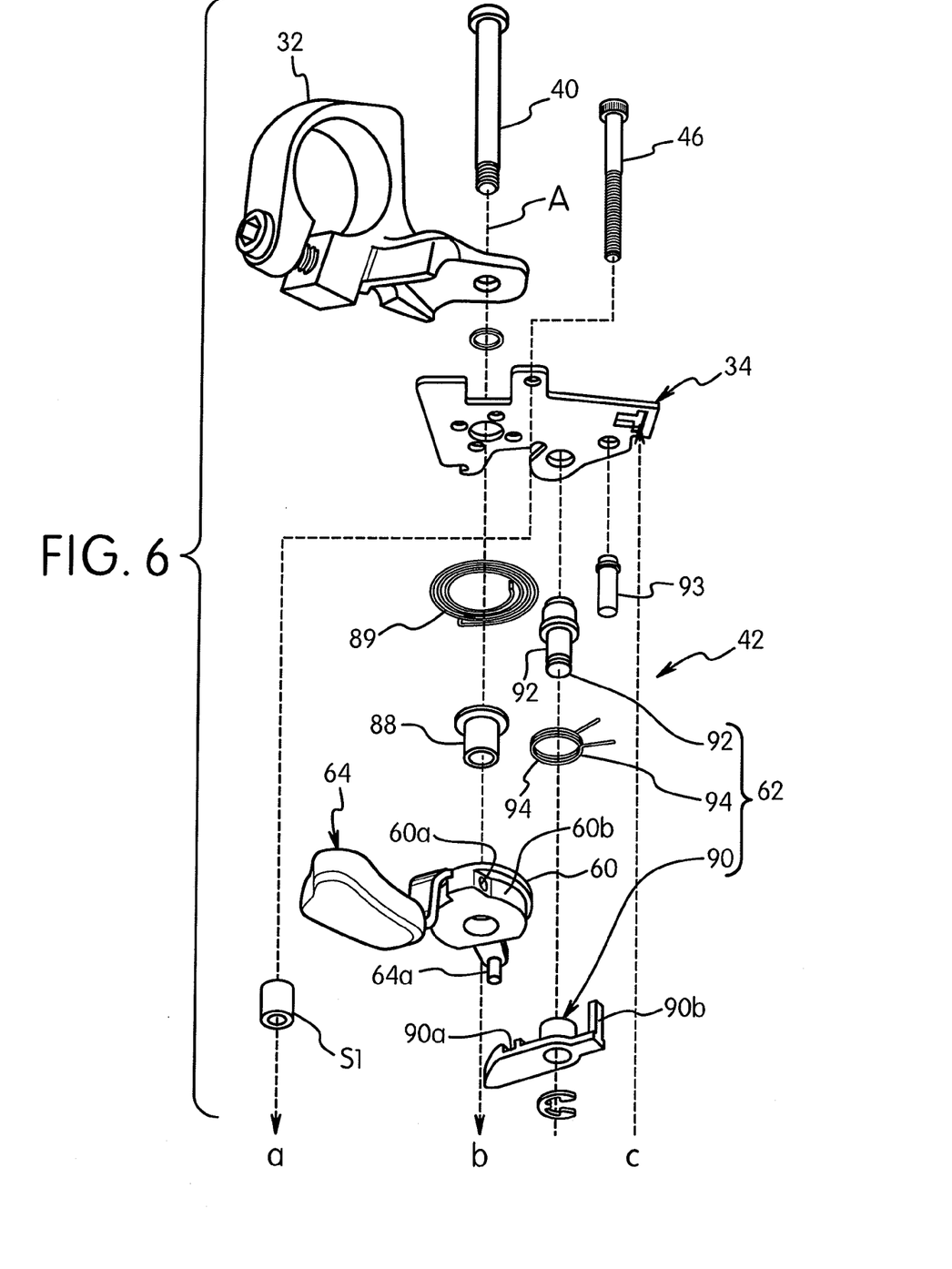
FIG. 6 is a simple exploded perspective view of a first part of the bicycle control or operating device in accordance with the illustrated embodiment.
Figure 7:
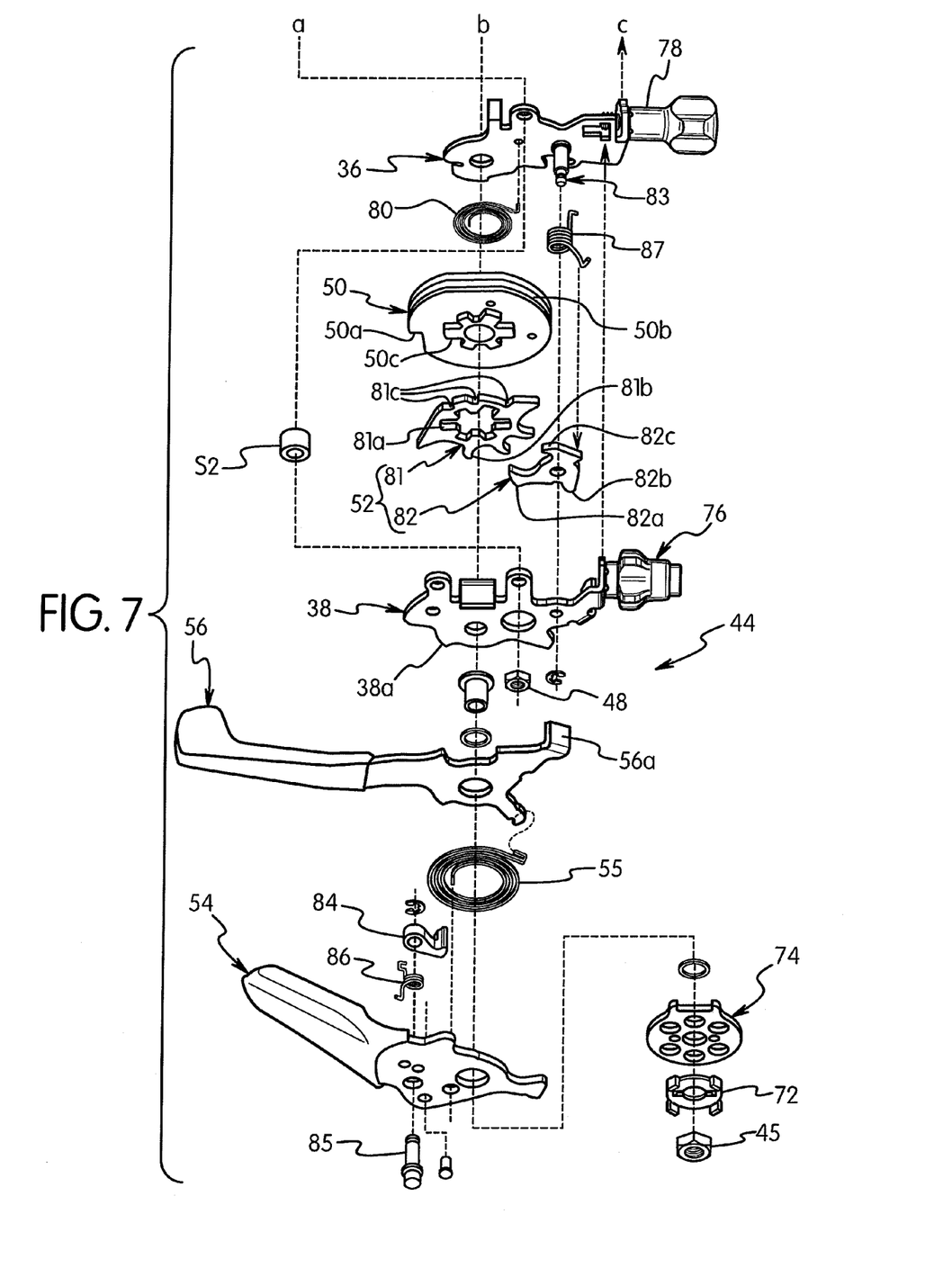
FIG. 7 is a simple exploded perspective view of a second part of the bicycle control or operating device in accordance with the illustrated embodiment.

As shown in FIGS. 5 to 7, the bicycle control device 12 basically includes an upper support plate 34, a middle support plate 36, a lower support plate 38, a main support shaft 40, a suspension control unit 42 and a shift control unit 44. The control units 42 and 44 are both operatively mounted on the main support shaft 40 via the support plates 34 to 38. The main support shaft 40 is supported by a shaft support portion of the clamp 32. The shift control unit 44 is configured to be connected to the front derailleur 14 with the front shift operating cable 20, while the suspension control unit 42 is configured to be connected to the cable operated lockout device 16c of the suspension fork 16 with the suspension state switching cable 22. For the sake of convenience, hereinafter, the shift control unit 44 will be referred to as a first control unit and the suspension control unit 42 will be referred to as a second control unit. Of course, the use of the first and second control units could be reversed, if desired.

The support plates 34, 36 and 38 are preferably rigid metal plates. The main support shaft 40 extends through the support plates 34, 36 and 38. The main support shaft 40 is preferably a bolt with a nut 45 threaded on its lower end. Thus, the support plates 34, 36 and 38 are coupled together by the main support shaft 40. The support plates 34, 36 and 38 are also secured together by a bolt 46 and a nut 48. The shaft of the bolt 46 is provided with a pair of spacers S1 and S2 for holding the support plates 34, 36 and 38 apart at the appropriate spacing. The suspension control unit 42 is mounted on the main support shaft 40 between the support plates 34 and 36. The shift control unit 44 is mounted on the main support shaft 40 with part of the shift control unit 44 being disposed between the support plates 36 and 38 and part of the shift control unit 44 being disposed below the lower support plate 38. The middle support plate 36 basically separates the shift (first) control unit 44 from the suspension (second) control unit 42.

The shift (first) control unit 44 basically includes a first wire takeup element 50, a first positioning structure 52 and a pair of shift operating levers 54 and 56. The parts of the shift (first) control unit 44 are basically supported on the middle support plate 36 and the lower support plate 38. The suspension (second) control unit 42 basically includes a second wire takeup element 60, a second positioning structure 62 and a suspension state switching lever 64. The parts of the shift (first) control unit 44 are basically supported on the upper support plate 34 and the middle support plate 36. The operating member 54 is a shift winding lever that constitutes a first operating member of the bicycle control device 12. The suspension state switching lever 64 is a suspension state switching lever that constitutes a second operating member of the bicycle control device 12. The suspension state switching lever 64 is disposed between the operating member 54 and the shaft support portion of the clamp 32 in an axial direction of the main support shaft 40. The operating lever 56 is a release lever 56 that constitutes a third operating member of the bicycle control device 12. Thus, the construction of this bicycle control device 12 is quite simple. The shift (first) control unit 44 has a conventional arrangement with a central pivot axis A defined by the main support shaft 40 and the first wire takeup element 50 rotatably mounted on the main support shaft 40. The second wire takeup element 60 of the suspension (second) control unit 42 is also rotatably mounted on the main support shaft 40. Thus, the first and second wire takeup elements 50 and 60 are both rotatably mounted about a common pivot axis using a single mounting axle formed by the main support shaft 40. The first wire takeup element 50 is stationary when the suspension state switching lever 64 is operated to change the current position of the second wire takeup element 60. Likewise, the second wire takeup element 60 is stationary when either of the shift winding lever 54 or the shift release lever 56 is operated to change the current position of the first wire takeup element 50. Thus, the current position of the first wire takeup element 50 always remains the same in response to operation of the suspension state switching lever 64. In other words, the operation of the levers 54, 56 and 64 are independent such that operation of the suspension state switching lever 64 never operates the first wire takeup element 50, and operation of the shift winding lever 54 and/or the shift release lever 56 never operates the second wire takeup element 60. Of course, one of the shift levers 54 and 56 could be operated at the same time as the suspension state switching lever 64 such that the first and second wire takeup elements 50 and 60 move (rotate) simultaneously.

The inner wire 20a of the front shift operating cable 20 is attached to the first wire takeup element 50, while the inner wire 22a of the suspension state switching cable 22 is attached to the second wire takeup element 60. The lower support plate 38 also preferably has a cable adjusting nut 76 for receiving the front shift operating cable 20, while the middle support plate 36 also preferably has a cable adjusting nut 78 for receiving the suspension state switching cable 22. The cable adjusting nuts 76 and 78 are conventional structures, and thus, it will not be discussed and/or illustrated in detail.

Referring now to FIG. 7, the shift winding lever 54 and the shift release lever 56 are disposed below the lower support plate 38 on the main support shaft 40. The nut 45 is threaded on the end of the main support shaft 40 to retain the shift winding lever 54 and the shift release lever 56 on the main support shaft 40. Preferably, a nut plate 72 and a retaining plate 74 are provided on the end of the main support shaft 40 between the lower support plate 38 and the shift winding lever 54.

The first wire takeup element 50 is rotatably mounted on the support shaft 40 to rotate with respect the housing 30 such that it can move in both a cable pulling direction (i.e., the rotational direction R1) and a cable releasing direction (i.e., the rotational direction R2) for pulling and releasing the inner wire 20a of the front shift operating cable 20. The first positioning structure 52 is configured to selectively position the first wire takeup element 50 in any one of a plurality of (e.g., three) actuation or operating positions corresponding to a plurality of (e.g., three) shift positions of the front derailleur 14.

The shift winding lever 54 is a lever member having a cable retraction (wind-in) lever function for a typical gear changer device. The shift winding lever 54 is rotatably mounted on the main support shaft 40 such that it can pivot freely between a rest or start position shown in FIG. 8 and an operation end position reached by pivoting clockwise (in FIGS. 8 to 11) from the rest or start position. The shift winding lever 54 is operatively coupled to the first positioning structure 52 to change a current position of the first wire takeup element 50. The shift winding lever 54 is rotatable in the first rotational direction R1 to rotate the first wire takeup element 50 in the first rotational direction R1. The shift winding lever 54 is a trigger lever that returns to a rest position after being moved to an operating position to change the current position of the first wire takeup element 50. In particular, the shift winding lever 54 is spring loaded toward the rest position by a spring member 55 (e.g., a spiral spring).

The shift release lever 56 is a lever member having a release lever function for a typical gear changer device. The shift release lever 56 is rotatably mounted on the main support shaft 40. The shift release lever 56 is configured to rotate the first wire takeup element 50 in a second rotational direction R2 that is opposite the first rotational direction R1. The shift release lever 56 is a trigger lever that returns to a rest position after being moved to an operating position to change the current position of the first wire takeup element 50. In particular, the shift release lever 56 is spring loaded toward the rest position by the spring member 55, which has one end engaged with the shift winding lever 54 and the other end engaged with the shift release lever 56.

The first wire takeup element 50 includes an inner cable holding section 50a configured to engage with a cable nipple fixed to a tip end of the inner wire 20a of the front shift operating cable 20 and a cable winding groove 50b for winding in the inner wire 20a are provided on an external circumferential surface of the first wire takeup element 50. The first wire takeup element 50 is spring loaded in the cable release direction (counterclockwise) by a spring member 80 (e.g., a torsional coil spring). One end of the spring member 80 engages with the first wire takeup element 50 and the other end engages with the middle support plate 36. The first wire takeup element 50 has an engaging protrusion 50c configured to cause a part of the first positioning structure 52 to rotate together with the first wire takeup element 50. The engaging protrusion 50c is a non-circular protrusion that is formed on a lower surface of the first wire takeup element 50.

The first positioning structure 52 basically includes a positioning member 81 and a positioning pawl 82. The positioning member 81 has an engaging hole 81a that engages with the engaging protrusion 50c of the first wire takeup element 50 such that the positioning member 81 moves integrally (as a unit) with the first wire takeup element 50. The positioning pawl 82 is pivotally mounted between the support plates 36 and 38 by a pivot pin 83. Generally speaking, the first positioning structure 52 is operatively coupled to the first wire takeup element 50 to selectively maintain the first wire takeup element 50 in one of at least two positions. The shift winding lever 54 is operatively coupled to the positioning member 81 of the first positioning structure 52 such that movement of the shift winding lever 54 in the first rotational direction R1 causes the first wire takeup element 50 to rotate in the first rotational direction R1 from a current shift position to a subsequent shift position with the positioning member 81 of the first positioning structure 52 holding the first wire takeup element 50 in the subsequent shift position. The shift release lever 56 is operatively coupled to the positioning pawl 82 of the first positioning structure 52 such that movement of the shift release lever 56 in the second rotational direction R2 causes the first wire takeup element 50 to rotate in the second rotational direction R2 from a current shift position to a subsequent shift position with the first positioning structure 52 holding the first wire takeup element 50 in the subsequent shift position.

The positioning member 81 has, for example, three positioning teeth 81b and three winding teeth 81c. The positioning pawl 82 has a stop tooth 82a, an actuating projection 82b and an over rotation preventing tooth 82c. The positioning pawl 82 is configured to move in a plane parallel to the positioning member 81 to selectively move the stop tooth 82a between an engaging position in which one of them engages with one of the positioning teeth 81b and a release position in which it does not engage one of the positioning teeth 81b. The over rotation preventing tooth 82c is configured to move between a contact position where it engages one of the positioning teeth 81b at a different position than the stop tooth 82a and a disengaged position where it does not engage one of the positioning teeth 81b.

The shift winding lever 54 is provided with a winding pawl 84 that is pivotally mounted on a pivot pin 85 that is fixed to the shift winding lever 54. A spring member 86 (e.g., a torsional coil spring) is provided on the pivot pin 85 with one end of the spring member 86 engaged with the shift winding lever 54 and the other end of the spring member 86 engaged with the winding pawl 84. The spring member 86 biases the winding pawl 84 towards the positioning member 81. The winding pawl 84 is configured to move between a winding position where it engages one of the winding teeth 81c and a release position where it separates from one of the winding teeth 81c. The number of positioning teeth 81b and the number of the winding teeth 81c corresponds to the number of shift positions of the front derailleur and the teeth 81b and 81c are configured to protrude radially outward from an external circumferential surface of the positioning member 81. Together with the first wire takeup element 50, the positioning member 81 is spring loaded in the cable release direction (counterclockwise) by the spring member 80. The size of the spaces between the positioning teeth 81b and the winding teeth 81c is determined based on the amount of cable movement required to achieve the shift positions of the front derailleur 14.

As mentioned above, the positioning pawl 82 is attached in a freely pivotal manner to the pivot shaft 83. The pivot shaft 83 is arranged to protrude from the bottom surface of the middle support plate 36. The positioning pawl 82 is spring loaded by a spring member 87 (e.g., a torsional coil spring) in the clockwise direction of FIGS. 8 to 9 such that the stop tooth 82a of positioning pawl 82 is arranged in the engaging position. The actuating projection 82b configured to protrude radially outward is provided on an external circumferential surface of the positioning pawl 82. A distal end portion of the actuating projection 82b engages with a movement transmitting protrusion 56a that has been formed by bending a distal end of the shift release lever 56.

Figure 8:
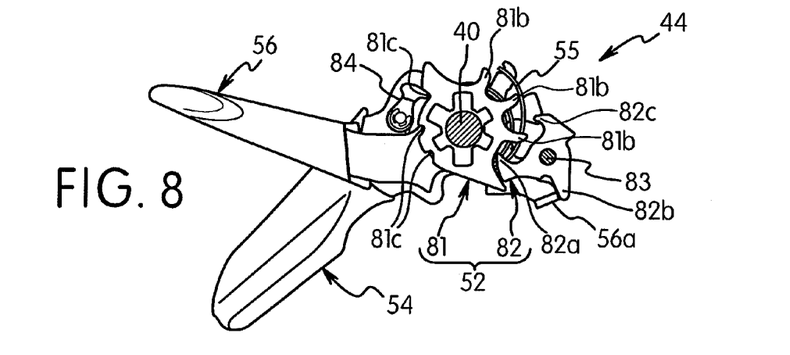
FIG. 8 is an enlarged top plan view of selected parts of the gear shifter component shown in a neutral or rest position.
Figure 9:
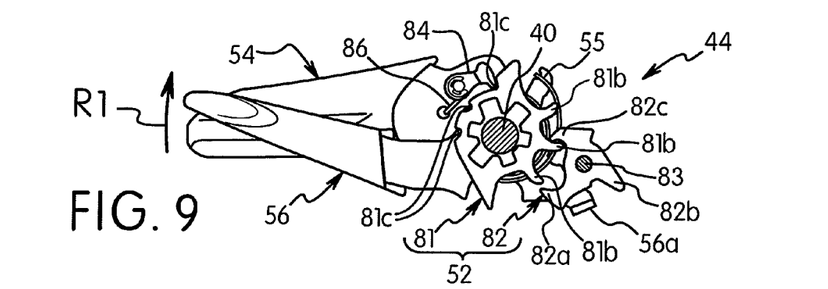
FIG. 9 is an enlarged top plan view, similar to FIG. 8, of selected parts of the gear shifter component illustrating the winding lever (e.g., a first operating member) in an intermediate position during a shifting operation in a first or winding direction.

As seen in FIG. 8, the stop tooth 82a of the positioning pawl 82 is configured to contact the positioning teeth 81b so as to stop rotation of the positioning member 81 (which is spring loaded in the counterclockwise direction of FIGS. 8 to 9) in the cable release direction. As seen in FIG. 9, when the over rotation preventing tooth 82c moves to the contact position by the movement transmitting protrusion 56a, the over rotation preventing tooth 82c contacts one of the positioning teeth 81b located one tooth downstream in the release direction from one of the positioning teeth 81b that the positioning pawl 82 was contacting, thereby preventing the positioning member 81 from continuing to rotate in the cable release direction after the positioning pawl separates from one of the positioning teeth 81b. When the over rotation preventing tooth 82c is in the contact position, the positioning pawl 82 is arranged in a position located beyond one of the positioning teeth 81b that it was originally engaged with.

As shown in FIG. 7, the winding pawl 84 is attached in a freely pivotal manner to the pivot pin 85 arranged protruding from the shift winding lever 54. The winding pawl 84 is spring loaded in the clockwise direction in FIGS. 8 to 11 by a spring member 86 (e.g., a torsional coil spring) such that the winding pawl 84 is arranged in the winding position. When the shift winding lever 54 is in an operation start or rest position, the winding pawl 84 rests on a contact part 38a, which serves to position the winding pawl 84 in the release position. Consequently, the winding pawl 84 is always arranged in the release position when the shift winding lever 54 is in the start or rest position. When the shift winding lever 54 is operated from the start or rest position toward an operation end position, the distal end of the winding pawl 84 rides off the contact part 38*a* to engage one of the winding teeth 81*c*. In other words, the winding pawl 84 pivots toward a winding position where it contacts the winding teeth 81*c* due to the spring load of the spring member 86, when the shift winding lever 54 is operated in the first rotational direction.

Turning to FIG. 6, the suspension state switching lever 64 is provided with a movement transmitting pin 64*a* that projects in a downward direction from the suspension state switching lever 64. The suspension state switching lever 64 is configured to pivot in the clockwise direction (the first rotational direction R1) of FIGS. 12 to 18. The suspension state switching lever 64 is mounted on the main support shaft 40 with a bushing 88. The suspension state switching lever 64 is spring loaded in the counterclockwise direction in FIGS. 11 to 18 by a spring member 89 (e.g., a coil spring), which has a first spring end engaged with the upper support plate 34 and a second spring end engaged with the suspension state switching lever 64. When the suspension state switching lever 64 is pivoted in the clockwise direction in FIGS. 11 to 18 from the neutral position, the movement transmitting pin 64*a* operates the second positioning structure 62.

The second wire takeup element 60 is formed integrally with the suspension state switching lever 64. The second wire takeup element 60 is rotatably mounted on the main support shaft 40 to rotate with respect the housing 30 such that it can move in both a cable pulling direction (i.e., the rotational direction R1) and a cable releasing direction (i.e., the rotational direction R2) for pulling and releasing the inner wire 22*a* of the suspension state switching cable 22. The second positioning structure 62 is configured to selectively position the second wire takeup element 60 in any one of a plurality of (e.g., two) actuation positions corresponding to a plurality of (e.g., two) state positions of the suspension fork 16. Although in this embodiment the second wire takeup element 60 and the suspension state switching lever 64 are formed as a one-piece integral unit, it is also acceptable to form the same as separate members.

As best seen in FIG. 6, the second wire takeup element 60 has an inner wire holding section 60*a* that is configured to engage with a cable nipple fixed to a tip end of the inner wire 22*a* of the suspension state switching cable 22 (FIG. 2). The second wire takeup element 60 also has an inner wire receiving surface 60*b* for winding in the inner wire 22*a* on an external circumferential surface of the second wire takeup element 60. The second wire takeup element 60 is spring loaded in the cable release direction (counterclockwise in FIGS. 12 to 18) by the spring member 89.

Figures 16, 17, 18:
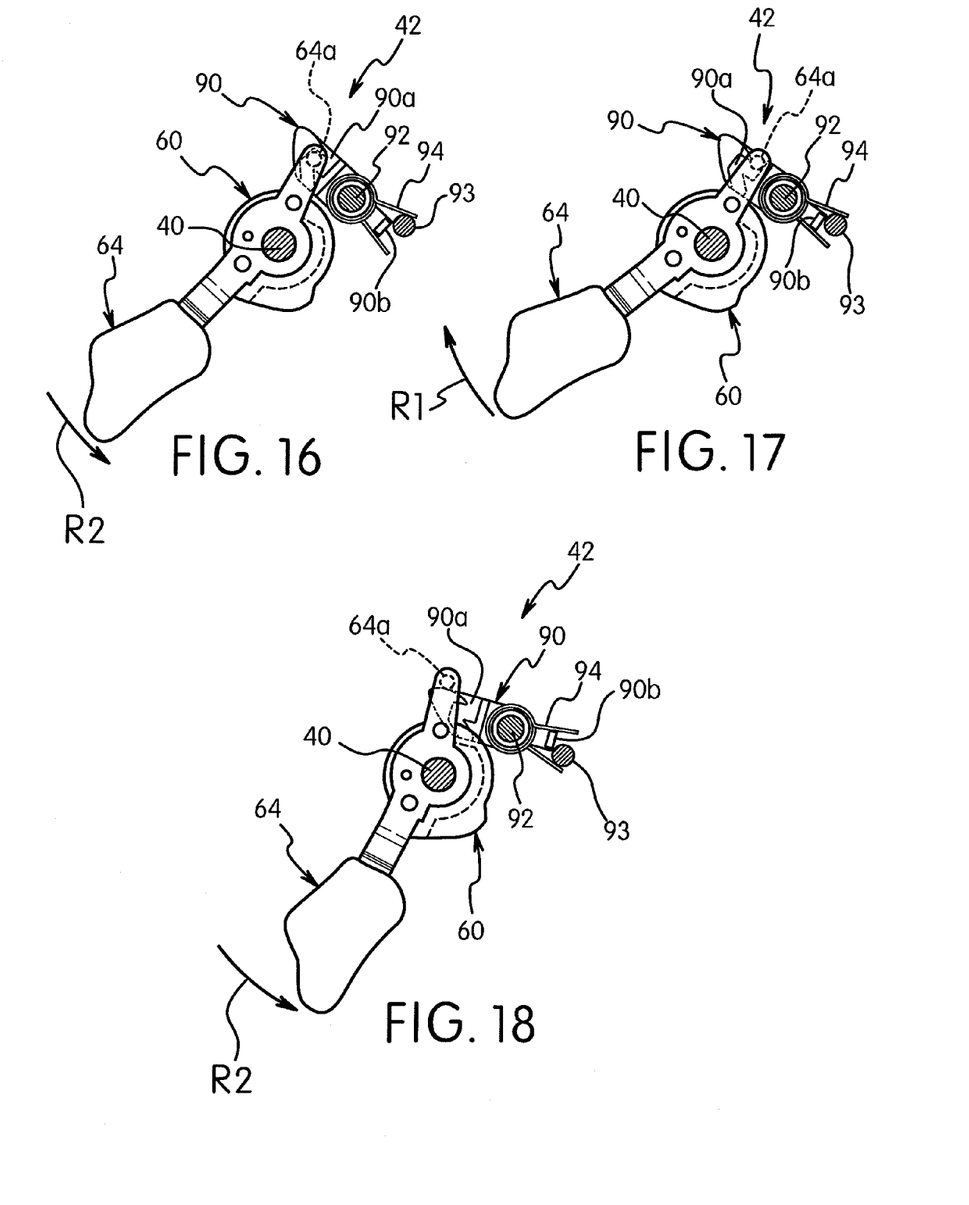
FIG. 16 is an enlarged top plan view, similar to FIGS. 12 to 15, of selected parts of the suspension control component illustrating the suspension actuating lever in a second rest position after the locked state has obtained by performing the suspension operating state switching operation shown in FIGS. 12 to 15.
FIG. 17 is an enlarged top plan view, similar to FIGS. 12 to 16, of selected parts of the suspension control component illustrating the suspension actuating lever in an intermediate position during a switching operation in which the suspension actuating lever being operated in the first direction to switch the suspension operating state from the locked state to the released state.
FIG. 18 is an enlarged top plan view, similar to FIGS. 12 to 17, of selected parts of the suspension control component illustrating the suspension actuating lever in a further intermediate position with respect to FIG. 17 during the switching operation in which the suspension actuating lever is operated in the first direction to switch the suspension operating state from the locked state to the released state.

The second positioning structure 62 cooperates with the suspension state switching lever 64 to selectively retain the second wire takeup element 60 in a first takeup element position (FIG. 12) when the suspension state switching lever 64 is in the first lever position (FIG. 12) and retain the second wire takeup element 60 in a second takeup element position (FIG. 16) when the suspension state switching lever 64 is in the second lever position (FIG. 16). As explained below, the second positioning structure 62 is operatively coupled to the second wire takeup element 60 via the suspension state switching lever 64 to selectively maintain the second wire takeup element 60 in one of at least two positions.

The second positioning structure 62 basically includes a lock member 90, a pivot pin 92, a stop pin 93 and a spring member 94. The lock member 90 is pivotally mounted to upper support plate 34 by the pivot pin 92. The lock member 90 includes a curved cam groove 90*a* and a control tab 90*b*. The curved cam groove 90*a* is formed in a portion of the lock member 90 that is located between a distal end of the lock member 90 and the pivot axis of the lock member 90 (i.e., toward the leftward end in FIGS. 12 to 18). More specifically, as shown in FIGS. 12-18, the curved cam groove 90*a* extends between two points on an external surface of the lock member 90. The curved cam groove 90*a* of the lock member 90 is intersected by a radius extending from the pivot axis of the lock member 90 to the distal end of the lock member 90. In addition, as understood from FIG. 16, the movement transmitting pin 64*a* is intersected by the radius extending from the pivot axis to the distal end of the lock member 90 as the suspension state switching lever 64 moves from the first lever position (FIG. 12) to the second lever position (FIG. 16). The curved cam groove 90*a* is configured to engage the movement transmitting pin 64*a* of the suspension state switching lever 64. In other words, the curved cam groove 90*a* selectively receives the movement transmitting pin 64*a* of the suspension state switching lever 64 to selectively lock the suspension state switching lever 64 in a second operating position that corresponds to the released state of the suspension fork 16.

Figure 12:
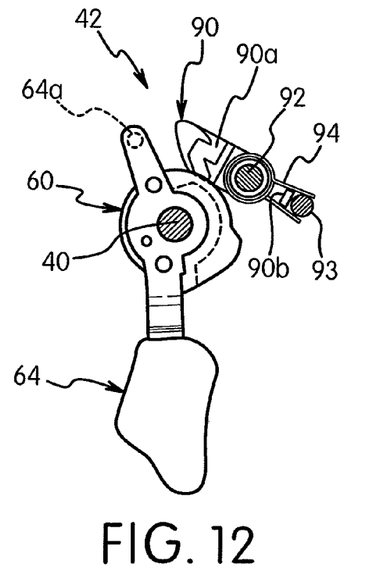
FIG. 12 is an enlarged top plan view of selected parts of the suspension control component in a first rest position in which the suspension actuating lever (e.g., a second operating member) is shown in a neutral or rest position corresponding to a first suspension operating (released) state.

The control tab 90*b* is formed in a portion of the lock member 90 that is located between a distal end of the lock member 90 and the pivot axis of the lock member 90 (i.e., toward the rightward end in FIGS. 12 to 18). The control tab 90*b* is also disposed between the free ends of the spring member 94 so that the lock member 90 is urged to a rest position as seen in FIG. 12.

The spring member 94 (e.g., a torsional coil spring) is mounted on the pivot pin 92 for biasing the lock member 90 to a rest position as seen in FIG. 12. In particular, the spring member 94 has its free ends contacting opposite sides of the stop pin 93. When the lock member 90 is pivoted about the pivot pin 92, the control tab 90*b* of the lock member 90 contacts and deflects one of the free ends of the spring member 94, while the other free end of the spring member 94 remains in contact with the stop pin 93 as seen in FIGS. 14 to 18. Thus, the spring member 94 applies an urging force on the control tab 90*b* of the lock member 90 to urge the lock member 90 to the rest position as seen in FIG. 12.

The suspension state switching lever 64 is operatively coupled to the second positioning structure 62 to change a current position of the second wire takeup element 60. The suspension state switching lever 64 is movable between a first lever position (FIG. 12) corresponding to the released state of the suspension fork 16 and a second lever position (FIG. 16) corresponding to the locked state of the suspension fork 16. The suspension state switching lever 64 is movable in the first rotational direction R1 from the first lever position (FIG. 12) to the second lever position (FIG. 16), and movable in the second rotational direction R2 from the second lever position (FIG. 16) to the first lever position (FIG. 12). The suspension state switching lever 64 is movable further in the first rotational direction R1 from the second lever position (FIG. 16) to a third lever position (FIG. 17), which releases the second wire takeup element 60 so that the second wire takeup element 60 returns to the first takeup element position (FIG. 12) and the suspension state switching lever 64 returns to the first lever position (FIG. 12).

The second positioning structure 62 is configured such that the second wire takeup element 60 moves alternately between two positions, i.e., a release position (FIG. 12) and a pulling position (FIG. 16), in response to pivotally movement of the suspension state switching lever 64 in the clockwise direction. As mentioned above, the lock member 90 of second positioning structure 62 is pivotally attached to the upper support plate 34 by the pivot pin 92 in a freely pivotal manner. The lock member 90 is spring loaded in rest position shown in FIG. 12 by the spring member 94 (e.g., a torsional coil spring). The lock member 90 is configured to be moved alternately between a first disengaged position shown in FIG. 12 and a second holding position shown in FIG. 16 by the movement transmitting pin 64a of the suspension state switching lever 64. The second holding position is located clockwise from the first disengaged position when viewed as shown in FIGS. 12 and 16.

Figure 13:
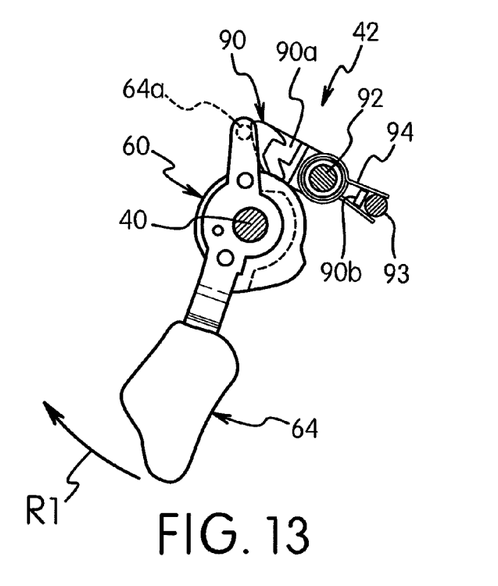
FIG. 13 is an enlarged top plan view, similar to FIG. 12, of selected parts of the suspension control component illustrating the suspension actuating lever in an intermediate position during a switching operation in which the suspension actuating lever is operated in the first direction to switch the suspension operating state from the released state to the locked state.
Figures 14, 15:
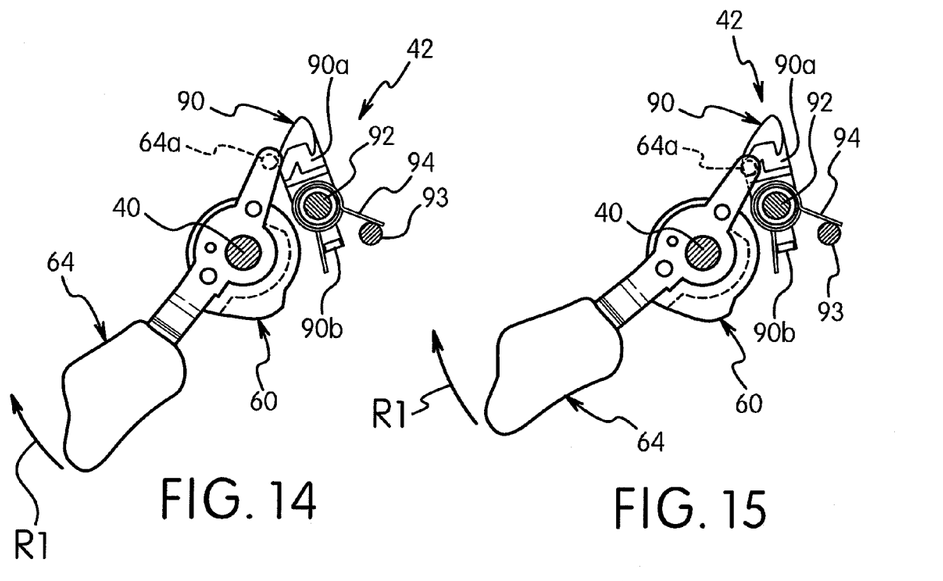
FIG. 14 is an enlarged top plan view, similar to FIGS. 12 and 13, of selected parts of the suspension control component illustrating the suspension actuating lever in a further intermediate position with respect to FIG. 13 during the switching operation in which the suspension actuating lever is operated in the first direction to switch the suspension operating state.
FIG. 15 is an enlarged top plan view, similar to FIGS. 12 to 14, of selected parts of the suspension control component illustrating the suspension actuating lever at a fully depressed position with the suspension operating state being in a second suspension operating (locked) state.

The lock member 90 is configured to pivot in response to a pivotal movement of the suspension state switching lever 64 in the clockwise direction of FIGS. 12 to 18 (the first rotational direction R1). In particular, as seen in FIG. 13, this pivotal movement of the suspension state switching lever 64 initially causes the movement transmitting pin 64a to initially engage an external surface of the lock member 90 in the vicinity of the distal end of the lock member 90. Then, as seen in FIG. 14, further pivotal movement of the suspension state switching lever 64 causes the movement transmitting pin 64a to move along the external surface of the lock member 90 such that the lock member 90 pivots in the clockwise direction until the movement transmitting pin 64a enters into the cam groove 90a of the lock member 90, as seen in FIG. 15. Finally, once the movement transmitting pin 64a enters into the cam groove 90a of the lock member 90, the lock member 90 pivots back in the counterclockwise direction as seen in FIG. 16 to operate and actuate the cable operated lockout device 16c to the locked state.

The operation of the shift control unit 44 of bicycle control device 12 in order to shift gears and switch the operating state of the suspension fork 16 will now be explained with reference to FIGS. 8 to 11. First, an operation of pulling the front shift operating cable 20 will be explained.

Figure 10:
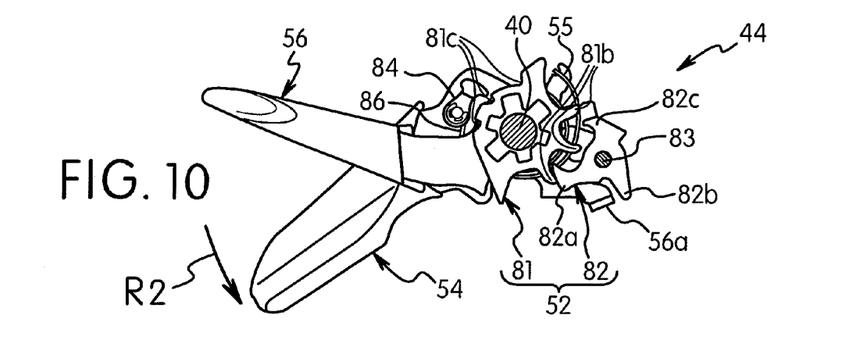
FIG. 10 is an enlarged top plan view, similar to FIGS. 8 and 9, of selected parts of the gear shifter component illustrating the winding lever being returned to the end from the shifting operation of FIG. 9.
Figure 11:
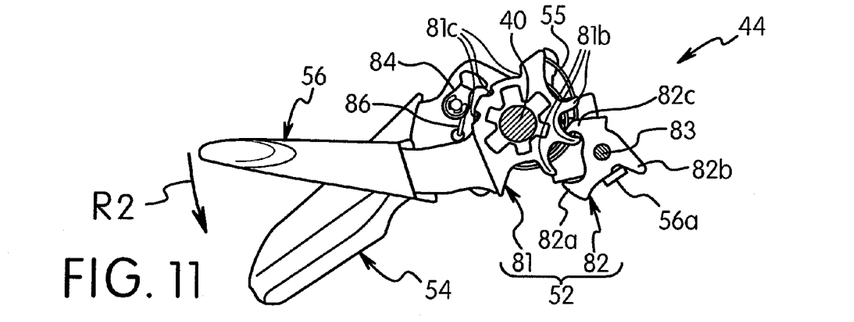
FIG. 11 is an enlarged top plan view, similar to FIGS. 8 to 10, of selected parts of the gear shifter component illustrating the release lever (e.g., a third operating member) in an intermediate position during a shifting operation in a second or release direction.

As shown in FIG. 11, a neutral state is shown in which neither the shift winding lever 54 nor the shift release lever 56 has been operated. In FIG. 11, the front derailleur 14 is in a first (low) position, i.e., the position corresponding to the sprocket having the smallest tooth count, and the first wire takeup element 50 is in the first actuation position. If, from the state shown in FIG. 11, a rider presses the shift winding lever 54 with a left thumb and moves the shift winding lever 54 clockwise, i.e., in the first rotational direction R1 in FIG. 11, from the start position toward the end position, then the winding pawl 84 will contact one of the winding teeth 81c of the positioning member 81 and the positioning member 81 and first wire takeup element 50 will be pivoted in the cable retracting (wind-in) direction, i.e., the clockwise direction of FIG. 11. This pivot movement causes the inner wire 20a to be pulled such that the front derailleur 14 moves toward an intermediate position corresponding to the middle sprocket, i.e., the sprocket having an intermediate diameter. During this movement, as shown in FIG. 9, the positioning pawl 82 is moved by the middle one of the positioning teeth 81b engaging the stop tooth 82a to rotate the positioning pawl 82 such that the positioning pawl 82 pivots in the counterclockwise direction. When the shift winding lever 54 has been pivoted to the end position and released, the shift winding lever 54 returns to the start position as shown in FIG. 10 due to the spring load of the spring member 55 and the positioning member 81 is positioned due to the engagement of the positioning pawl 82 with the positioning teeth 81b. Meanwhile, the winding pawl 84 is arranged in a released position where it is separated from the winding teeth 81c by the contact part 38a of the lower support plate 38. In this state, the first wire takeup element 50 is positioned in the second actuation position.

Now an operation of releasing the front shift operating cable 20 will be explained. If, from the state shown in FIG. 10, the shift release lever 56 is moved counterclockwise, i.e., in the second rotational direction R2, then the movement transmitting protrusion 56a of the shift release lever 56 contacts the actuating projection 82b to rotate the positioning pawl 82 in a counterclockwise direction. As a result, the over rotation preventing tooth 82c is moved in between two of the positioning teeth 81b to prevent the positioning member 81 from rotating to far under the force of the spring member 80. Thus, when the positioning pawl 82 pivots counterclockwise, the positioning pawl 82 separates from one of the positioning teeth 81b and the positioning member 81 rotates counterclockwise together with the first wire takeup element 50 in the cable release direction. When the positioning member 81 rotates in the cable release direction, the over rotation preventing tooth 82c of the positioning pawl 82 contacts one of the positioning teeth 81b located one tooth away from one of the positioning teeth 81b and the positioning member 81 stops rotating. When the rider releases the shift release lever 56, the shift release lever 56 returns to the neutral position as shown in FIG. 8 due to the spring force of the spring member 55. The positioning pawl 82 then rotates counterclockwise due to the spring member 87 and the over rotation preventing tooth 82c separates from one of the positioning teeth 81b, causing the positioning member 81 to rotate counterclockwise again. However, the positioning pawl 82 contacts the positioning teeth 81b and causes the positioning member 81 and the first wire takeup element 50 to be positioned (i.e., held in a position corresponding to the low gear). As a result, the inner wire 20a of the shift operating cable 20 is released by such an amount that the front derailleur 14 moves to the low position.

Now, operation of the suspension (second) control unit 42 of the bicycle control device 12 will be discussed with reference to FIGS. 12 to 18. First, an operation of pulling the suspension state switching cable 22 will be explained.

When the second wire takeup element 60 is in the release position, i.e., the state shown in FIG. 12, and the suspension state switching lever 64 is operated in the first rotational direction R1, i.e., the clockwise direction of FIG. 12, the movement transmitting pin 64a provided on the suspension state switching lever 64 is pressed an external surface of the lock member 90 in the vicinity of the distal end of the lock member 90, as shown in FIG. 13. The movement transmitting pin 64a moves along an external surface of the lock member 90 and causes the lock member 90 to pivot clockwise, as shown in FIGS. 14 and 15. At an intermediate point during this movement, the movement transmitting pin 64a reaches an end portion of the cam groove 90a and engages with the cam groove 90a so as to enter the cam groove 90a. The cam groove 90a has a stopping portion where it bends approximately 90 degrees such that the movement transmitting pin 64a can be stopped. When the movement transmitting pin 64a enters the cam groove 90a, the lock member 90 pivots counterclockwise due to the spring force of the spring member 94 until, as shown in FIG. 16, the movement transmitting pin 64a is stopped by the stopping portion such that the lock member 90 becomes held in the second holding position. The suspension state switching lever 64 is thus positioned by the lock member 90. As a result, the second wire takeup element 60 is positioned in the lock position. When the second wire takeup element 60 is positioned in the lock position, the suspension state switching cable 22 causes the suspension fork 16 to be in a locked state in which it does not produce a suspension effect. If the rider releases the suspension state switching lever 64, while the lock member 90 is positioned in the second holding position, then the suspension state switching lever 64 will remain in the second lever position as seen in FIG. 16.

In the state shown in FIG. 16, if the rider wishes to release the locked suspension fork 14, then the ride operates the suspension state switching lever 64 in the first rotational direction R1, i.e., the clockwise direction of FIG. 16. Thus, the suspension state switching lever 64 is movable further in the first rotational direction R1 from the second lever position (FIG. 16) to the third lever position (FIG. 17), which allows the movement transmitting pin 64a exits the cam groove 90a. The movement transmitting pin 64a then rides along the external surface of the lock member 90 as seen in FIG. 18. Once the movement transmitting pin 64a disengages the external surface of the lock member 90, then the lock member 90 pivots clockwise due to the spring force of the spring member 94 back to its initial position as shown in FIG. 12. Thus, the second wire takeup element 60 is released so that the second wire takeup element 60 returns to the first takeup element position (FIG. 12) and the suspension state switching lever 64 returns to the first lever position (FIG. 12). As a result, the suspension fork 16 is returned to a released state in which the suspension function is produced.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
   a main support shaft;
   a clamp configured to be coupled to a handlebar of a bicycle;
   a first control unit including a first wire takeup element rotatably mounted on the main support shaft, a first positioning structure operatively coupled to the first wire takeup element to selectively maintain the first wire takeup element in one of at least two positions, and a first operating member operatively coupled to the first positioning structure to change a current position of the first wire takeup element; and
   a second control unit including a spring member, a second wire takeup element rotatably mounted on the main support shaft, a second positioning structure operatively coupled to the second wire takeup element to selectively maintain the second wire takeup element in one of at least two positions, and a second operating member operatively coupled to the second positioning structure to change a current position of the second wire takeup element, the second operating member being disposed between the first operating member and the clamp in an axial direction of the main support shaft,
   the first wire takeup element being stationary when the second operating member is operated to change the current position of the second wire takeup element such that the current position of the first wire takeup element always remains the same in response to operation of the second operating member,
   the second operating member including a lever member with a movement transmitting pin, the lever member being configured to be biased by a force exerted by the spring member in a first direction to a first lever position, and being movable between the first lever position and a second lever position in a second direction opposite the first direction, and
   the second positioning structure including a lock member with a cam groove, the lock member being configured to pivot about a pivot axis of the lock member in response to a movement of the lever member, the cam groove of the lock member selectively receiving the movement transmitting pin, the can groove of the lock member engaging the movement transmitting pin to retain the lever member in the second lever position when the lever member is in the second lever position, the movement transmitting pin being free from engagement with the lock member when the lever member is in the first lever position, and the movement transmitting pin moving closer to the pivot axis of the lock member as the lever member moves from the first lever position to the second lever position.

2. The bicycle control device according to claim 1, wherein the first control unit further includes a third operating member operatively coupled to the first positioning structure, with the first operating member being configured to rotate the first wire takeup element in a first rotational direction and the third operating member being configured to rotate the first wire takeup element in a second rotational direction that is opposite the first rotational direction.

3. The bicycle control device according to claim 2, wherein the first and third operating members are rotatably mounted on the main support shaft.

4. The bicycle control device according to claim 3, wherein the first operating member is rotatable in the first rotational direction to rotate the first wire takeup element in the first rotational direction, and the third operating member is rotatable in the second rotational direction to rotate the first wire takeup element in the second rotational direction.

5. The bicycle control device according to claim 4, wherein the first and third operating members are each a trigger lever that returns to a rest position after being moved to an operating position to change the current position of the first wire takeup element.

6. The bicycle control device according to claim 1, wherein the second positioning structure cooperates with the lever member to selectively retain the second wire takeup element in a first takeup element position when the lever member is in the first lever position and retain the second wire takeup element in a second takeup element position when the lever member is in the second lever position.

7. The bicycle control device according to claim 1, wherein the clamp has a shaft support portion supporting the main support shaft, and the second operating member is disposed between the first operating member and the shaft support portion of the clamp in the axial direction of the main support shaft.

8. The bicycle control device according to claim 1, wherein the cam groove is disposed between a distal end of the lock member and the pivot axis of the lock member.

9. The bicycle control device according to claim 8, wherein the cam groove of the lock member is intersected by a radius extending from the pivot axis of the lock member to the distal end of the lock member.

10. The bicycle control device according to claim 9, wherein
the movement transmitting pin is intersected by the radius extending from the pivot axis to the distal end as the lever member moves from the first lever position to the second lever position.

11. The bicycle control device according to claim 8, wherein
the second positioning structure further includes a biasing member; and
the lock member further includes a control tab with the pivot axis being disposed between the control tab and the distal end of the lock member, the control tab contacting and moving the biasing member as the lever member moves from the first lever position to the second lever position.

12. The bicycle control device according to claim 1, wherein
the second positioning structure further includes a biasing member having first and second free ends, and
the lock member further includes a control tab, the control tab contacting both the first and second free ends of the biasing member with the lever member being in the first lever position, and the control tab moving the first free end and separating from the second free end as the lever member moves from the first lever position to the second lever position.

* * * * *